(12) United States Patent
Chikatamalla et al.

(10) Patent No.: US 11,790,356 B2
(45) Date of Patent: Oct. 17, 2023

(54) SYSTEM, METHOD, AND COMPUTER PROGRAM PRODUCT FOR DYNAMIC PASSCODE COMMUNICATION

(71) Applicant: Visa International Service Association, San Francisco, CA (US)

(72) Inventors: Siddhartha Chikatamalla, Willoughby, OH (US); Chandra S. Balasubramanian, Shaker Heights, OH (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/632,556

(22) PCT Filed: Sep. 1, 2021

(86) PCT No.: PCT/US2021/048642
§ 371 (c)(1),
(2) Date: Feb. 3, 2022

(87) PCT Pub. No.: WO2023/033818
PCT Pub. Date: Mar. 9, 2023

(65) Prior Publication Data
US 2023/0067023 A1 Mar. 2, 2023

(51) Int. Cl.
*G06Q 20/38* (2012.01)
*G06Q 20/42* (2012.01)
(Continued)

(52) U.S. Cl.
CPC ......... *G06Q 20/385* (2013.01); *G06Q 20/027* (2013.01); *G06Q 20/382* (2013.01); *G06Q 20/40* (2013.01); *G06Q 20/42* (2013.01)

(58) Field of Classification Search
CPC .. G06Q 20/385; G06Q 20/027; G06Q 20/382; G06Q 20/40; G06Q 20/42
(Continued)

(56) References Cited

U.S. PATENT DOCUMENTS 6,650,747 B1 11/2003 Bala et al.
2005/0036611 A1 2/2005 Seaton, Jr. et al.
(Continued)

FOREIGN PATENT DOCUMENTS

WO WO-2016042473 A1 * 3/2016 ............. G06F 21/31

OTHER PUBLICATIONS

Visa by Topic Fact Sheet: Dynamic Passcode Authentication; http://corporate.visa.com/md/fs/ecommerce/passcode_authentication_print.jsp; Mar. 20, 2007 (Year: 2007).*
(Continued)

*Primary Examiner* — Hai Tran
(74) *Attorney, Agent, or Firm* — THE WEBB LAW FIRM

(57) ABSTRACT

Systems, methods, and computer program products for dynamic passcode communication use a merchant application installed on a user device that receives transaction data associated with a transaction at a merchant system. The transaction data may include an account identifier associated with an account at an issuer system. The merchant application determines, based on the account identifier, whether an issuer application associated with the issuer system is installed on the user device. In response to determining that the issuer application is installed on the user device, the merchant application transmits, to the issuer application, a request for a dynamic passcode. The merchant application receives, from the issuer application, the dynamic passcode and transmits, to the issuer system, an authorization request including the account identifier and the dynamic passcode.
(Continued)

The merchant application receives, from the issuer system, an authorization response authorizing or denying the transaction.

14 Claims, 6 Drawing Sheets

(51) Int. Cl.
*G06Q 20/02* (2012.01)
*G06Q 20/40* (2012.01)

(58) Field of Classification Search
USPC .......................................................... 705/44
See application file for complete search history.

(56) References Cited

U.S. PATENT DOCUMENTS

| | | | |
|---|---|---|---|
| 2008/0040285 A1 | 2/2008 | Wankmueller | |
| 2008/0222036 A1 | 9/2008 | Asai et al. | |
| 2013/0317989 A1* | 11/2013 | Fisher | G06Q 30/06 |
| | | | 705/44 |
| 2017/0109745 A1 | 4/2017 | Al-Bedaiwi et al. | |
| 2020/0280557 A1* | 9/2020 | Ravi | G06F 21/45 |
| 2022/0210151 A1* | 6/2022 | Williams | H04L 63/0861 |

OTHER PUBLICATIONS

Harun-Ar-Rashid, "Independent Channel Multi Method Multi-Factor Authentication (MMM-FA) model for B2P remote Commerce", 2006 10th IEEE International Enterprise Distributed Object computing conference Workshops (EDOCW'06), 2006, 4 pages.

* cited by examiner

SYSTEM, METHOD, AND COMPUTER PROGRAM PRODUCT FOR DYNAMIC PASSCODE COMMUNICATION

CROSS-REFERENCE TO RELATED APPLICATION

This application is the United States national phase of International Application No. PCT/US2021/048642 filed Sep. 1, 2021, the entire disclosure of which is hereby incorporated by reference in its entirety.

BACKGROUND

1. Field

This disclosure relates to electronic payment networks and, in some non-limiting embodiments or aspects, to dynamic passcode communication for frictionless multi-factor authentication (MFA) for electronic payments.

2. Technical Considerations

Multi-factor authentication (MFA) (or two-factor authentication) is an electronic authentication method in which a user is authorized only after successfully presenting two or more pieces of evidence (or factors) to an authentication mechanism (e.g., a user-controlled password with a dynamic passcode or one-time password (OTP), etc.). MFA protects the user from an unknown person trying to access and/or use their data such as personal ID details or financial assets. For example, payment service requirements, such as strong customer authentication (SCA), and/or the like, may require that electronic payments be performed with MFA, to increase the security of the electronic payments. However, the additional factors required by MFA may increase a number of steps that a customer performs to successfully complete a transaction, increase a number of application calls after a transaction is initiated, and/or increase a number of communications between transaction processing systems.

SUMMARY

Accordingly, provided are improved systems, devices, products, apparatus, and/or methods for dynamic passcode communication.

According to some non-limiting embodiments or aspects, provided is a computer-implemented method including: receiving, with at least one processor, with a merchant application installed on a user device, transaction data associated with a transaction at a merchant system, wherein the merchant application is associated with the merchant system, wherein the transaction data includes an account identifier associated with an account at an issuer system; determining, with the at least one processor, with the merchant application, based on the account identifier, whether an issuer application associated with the issuer system is installed on the user device; in response to determining that the issuer application associated with the issuer system is installed on the user device, transmitting, with the at least one processor, from the merchant application, to the issuer application, a request for a dynamic passcode; receiving, with the at least one processor, with the merchant application, from the issuer application, the dynamic passcode; transmitting, with the at least one processor, from the merchant application, to the issuer system, an authorization request requesting authorization of the transaction, wherein the authorization request includes the account identifier and the dynamic passcode; and receiving, with the at least one processor, with the merchant application, from the issuer system, an authorization response authorizing or denying the transaction.

In some non-limiting embodiments or aspects, the method further includes: before receiving, with the merchant application installed on the user device, the transaction data associated with the transaction at the merchant system, transmitting, with the at least one processor, from the merchant application, to a payment gateway system, a request to register the merchant application installed on the user device with the payment gateway system; and in response to transmitting the request to register the merchant application installed on the user device, receiving, with the at least one processor, with the merchant application, from the payment gateway system, a confirmation that the merchant application is registered with the payment gateway system.

In some non-limiting embodiments or aspects, determining whether the issuer application associated with the issuer system is installed on the user device includes: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

In some non-limiting embodiments or aspects, the at least one processor transmits the authorization request from the merchant application to the issuer system via the merchant system and the payment gateway system.

In some non-limiting embodiments or aspects, the at least one processor receives the authorization response with the merchant application from the issuer system via the merchant system and the payment gateway system.

In some non-limiting embodiments or aspects, the method further includes: receiving, with the at least one processor, with the issuer application, from the merchant application, the request for the dynamic passcode; in response to receiving the request for the dynamic passcode, generating, with the at least one processor, with the issuer application, the dynamic passcode; and transmitting, with the at least one processor, from the issuer application, to the merchant application, the dynamic passcode.

In some non-limiting embodiments or aspects, the method further includes: before receiving, with the merchant application installed on the user device, the transaction data associated with the transaction at the merchant system, transmitting, with the at least one processor, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receiving, with the at least one processor, with the issuer application, from the issuer system, a confirmation that the issuer application is registered with the issuer system.

According to some non-limiting embodiments or aspects, provided is a system including: at least one processor programmed and/or configured to: receive, with a merchant application installed on a user device, transaction data associated with a transaction at a merchant system, wherein the merchant application is associated with the merchant system, wherein the transaction data includes an account identifier associated with an account at an issuer system; determine, with the merchant application, based on the account identifier, whether an issuer application associated with the issuer system is installed on the user device; in response to determining that the issuer application associated with the issuer system is installed on the user device, transmit, from the merchant application, to the issuer application, a request for a dynamic passcode; receive, with the merchant application, from the issuer application, the dynamic passcode; transmit, from the merchant application, to the issuer system, an authorization request requesting authorization of the transaction, wherein the authorization request includes the account identifier and the dynamic passcode; and receive, with the merchant application, from the issuer system, an authorization response authorizing or denying the transaction.

In some non-limiting embodiments or aspects, the at least one processor is further programmed and/or configured to: before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

In some non-limiting embodiments or aspects, the at least one processor is programmed and/or configured to determine whether the issuer application associated with the issuer system is installed on the user device by: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

In some non-limiting embodiments or aspects, the at least one processor is further programmed and/or configured to transmit the authorization request from the merchant application to the issuer system via the merchant system and the payment gateway system.

In some non-limiting embodiments or aspects, the at least one processor is further programmed and/or configured to receive the authorization response with the merchant application from the issuer system via the merchant system and the payment gateway system.

In some non-limiting embodiments or aspects, the at least one processor is further programmed and/or configured to: receive, with the issuer application, from the merchant application, the request for the dynamic passcode; in response to receiving the request for the dynamic passcode, generate, with the issuer application, the dynamic passcode; and transmit, from the issuer application, to the merchant application, the dynamic passcode.

In some non-limiting embodiments or aspects, the at least one processor is further programmed and/or configured to: before receiving, with the merchant application installed on the user device, the transaction data associated with the transaction at the merchant system, transmit, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receive, with the issuer application, from the issuer system, a confirmation that the issuer application is registered with the issuer system.

According to some non-limiting embodiments or aspects, provided is a computer program product comprising at least one non-transitory computer-readable medium including program instructions that, when executed by at least one processor, cause the at least one processor to: receive, with a merchant application installed on a user device, transaction data associated with a transaction at a merchant system, wherein the merchant application is associated with the merchant system, wherein the transaction data includes an account identifier associated with an account at an issuer system; determine, with the merchant application, based on the account identifier, whether an issuer application associated with the issuer system is installed on the user device; in response to determining that the issuer application associated with the issuer system is installed on the user device, transmit, from the merchant application, to the issuer application, a request for a dynamic passcode; receive, with the merchant application, from the issuer application, the dynamic passcode; transmit, from the merchant application, to the issuer system, an authorization request requesting authorization of the transaction, wherein the authorization request includes the account identifier and the dynamic passcode; and receive, with the merchant application, from the issuer system, an authorization response authorizing or denying the transaction.

In some non-limiting embodiments or aspects, the program instructions, when executed by the at least one processor, further cause the at least one processor to: before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

In some non-limiting embodiments or aspects, the program instructions, when executed by the at least one processor, cause the at least one processor to determine whether the issuer application associated with the issuer system is installed on the user device by: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

In some non-limiting embodiments or aspects, the program instructions, when executed by the at least one processor, further cause the at least one processor to: transmit the authorization request from the merchant application to the issuer system via the merchant system and the payment gateway system; and receive the authorization response with the merchant application from the issuer system via the merchant system and the payment gateway system.

In some non-limiting embodiments or aspects, the program instructions, when executed by the at least one processor, further cause the at least one processor to: receive, with the issuer application, from the merchant application, the request for the dynamic passcode; in response to receiving the request for the dynamic passcode, generate, with the issuer application, the dynamic passcode; and transmit, from the issuer application, to the merchant application, the dynamic passcode.

In some non-limiting embodiments or aspects, the program instructions, when executed by the at least one processor, further cause the at least one processor to: before receiving, with the merchant application installed on the user device, the transaction data associated with the transaction at the merchant system, transmit, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receive, with the issuer application, from the issuer system, a confirmation that the issuer application is registered with the issuer system.

Further non-limiting embodiments or aspects are set forth in the following numbered clauses:

Clause 1. A computer-implemented method comprising: receiving, with at least one processor, with a merchant application installed on a user device, transaction data associated with a transaction at a merchant system, wherein the merchant application is associated with the merchant system, wherein the transaction data includes an account identifier associated with an account at an issuer system; determining, with the at least one processor, with the merchant application, based on the account identifier, whether an issuer application associated with the issuer system is installed on the user device; in response to determining that the issuer application associated with the issuer system is installed on the user device, transmitting, with the at least one processor, from the merchant application, to the issuer application, a request for a dynamic passcode; receiving, with the at least one processor, with the merchant application, from the issuer application, the dynamic passcode; transmitting, with the at least one processor, from the merchant application, to the issuer system, an authorization request requesting authorization of the transaction, wherein the authorization request includes the account identifier and the dynamic passcode; and receiving, with the at least one processor, with the merchant application, from the issuer system, an authorization response authorizing or denying the transaction.

Clause 2. The computer-implemented method of clause 1, further comprising: before receiving, with the merchant application installed on the user device, the transaction data associated with the transaction at the merchant system, transmitting, with the at least one processor, from the merchant application, to a payment gateway system, a request to register the merchant application installed on the user device with the payment gateway system; and in response to transmitting the request to register the merchant application installed on the user device, receiving, with the at least one processor, with the merchant application, from the payment gateway system, a confirmation that the merchant application is registered with the payment gateway system.

Clause 3. The computer-implemented method of clauses 1 or 2, wherein determining whether the issuer application associated with the issuer system is installed on the user device includes: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

Clause 4. The computer-implemented method of any of clauses 1-3, wherein the at least one processor transmits the authorization request from the merchant application to the issuer system via the merchant system and the payment gateway system.

Clause 5. The computer-implemented method of any of clauses 1-4, wherein the at least one processor receives the authorization response with the merchant application from the issuer system via the merchant system and the payment gateway system.

Clause 6. The computer-implemented method of any of clauses 1-5, further comprising: receiving, with the at least one processor, with the issuer application, from the merchant application, the request for the dynamic passcode; in response to receiving the request for the dynamic passcode, generating, with the at least one processor, with the issuer application, the dynamic passcode; and transmitting, with the at least one processor, from the issuer application, to the merchant application, the dynamic passcode.

Clause 7. The computer-implemented method of any of clauses 1-6, further comprising: before receiving, with the merchant application installed on the user device, the transaction data associated with the transaction at the merchant system, transmitting, with the at least one processor, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receiving, with the at least one processor, with the issuer application, from the issuer system, a confirmation that the issuer application is registered with the issuer system.

Clause 8. A system comprising: at least one processor programmed and/or configured to: receive, with a merchant application installed on a user device, transaction data associated with a transaction at a merchant system, wherein the merchant application is associated with the merchant system, wherein the transaction data includes an account identifier associated with an account at an issuer system; determine, with the merchant application, based on the account identifier, whether an issuer application associated with the issuer system is installed on the user device; in response to determining that the issuer application associated with the issuer system is installed on the user device, transmit, from the merchant application, to the issuer application, a request for a dynamic passcode; receive, with the merchant application, from the issuer application, the dynamic passcode; transmit, from the merchant application, to the issuer system, an authorization request requesting authorization of the transaction, wherein the authorization request includes the account identifier and the dynamic passcode; and receive, with the merchant application, from the issuer system, an authorization response authorizing or denying the transaction.

Clause 9. The system of clause 8, wherein the at least one processor is further programmed and/or configured to: before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

Clause 10. The system of clauses 8 or 9, wherein the at least one processor is programmed and/or configured to determine whether the issuer application associated with the issuer system is installed on the user device by: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

Clause 11. The system of any of clauses 8-10, wherein the at least one processor is further programmed and/or configured to transmit the authorization request from the merchant application to the issuer system via the merchant system and the payment gateway system.

Clause 12. The system of any of clauses 8-11, wherein the at least one processor is further programmed and/or configured to receive the authorization response with the merchant application from the issuer system via the merchant system and the payment gateway system.

Clause 13. The system of any of clauses 8-12, wherein the at least one processor is further programmed and/or configured to: receive, with the issuer application, from the merchant application, the request for the dynamic passcode; in response to receiving the request for the dynamic passcode, generate, with the issuer application, the dynamic passcode; and transmit, from the issuer application, to the merchant application, the dynamic passcode.

Clause 14. The system of any of clauses 8-13, wherein the at least one processor is further programmed and/or configured to: before receiving, with the merchant application installed on the user device, the transaction data associated with the transaction at the merchant system, transmit, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receive, with the issuer application, from the issuer system, a confirmation that the issuer application is registered with the issuer system.

Clause 15. A computer program product comprising at least one non-transitory computer-readable medium including program instructions that, when executed by at least one processor, cause the at least one processor to: receive, with a merchant application installed on a user device, transaction data associated with a transaction at a merchant system, wherein the merchant application is associated with the merchant system, wherein the transaction data includes an account identifier associated with an account at an issuer system; determine, with the merchant application, based on the account identifier, whether an issuer application associated with the issuer system is installed on the user device; in response to determining that the issuer application associated with the issuer system is installed on the user device, transmit, from the merchant application, to the issuer application, a request for a dynamic passcode; receive, with the merchant application, from the issuer application, the dynamic passcode; transmit, from the merchant application, to the issuer system, an authorization request requesting authorization of the transaction, wherein the authorization request includes the account identifier and the dynamic passcode; and receive, with the merchant application, from the issuer system, an authorization response authorizing or denying the transaction.

Clause 16. The computer program product of clause 15, wherein the program instructions, when executed by the at least one processor, further cause the at least one processor to: before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

Clause 17. The computer program product of clauses 15 or 16, wherein the program instructions, when executed by the at least one processor, cause the at least one processor to determine whether the issuer application associated with the issuer system is installed on the user device by: transmitting, from the merchant application, to the payment gateway system, at least a portion of the account identifier; receiving, with the merchant application, from the payment gateway system, an identification of the issuer application associated with the issuer system associated with the account identifier; and determining, based on the identification, with the merchant application, whether the issuer application associated with the issuer system associated with the account identifier is installed on the user device.

Clause 18. The computer program product of any of clauses 15-17, wherein the program instructions, when executed by the at least one processor, further cause the at least one processor to: transmit the authorization request from the merchant application to the issuer system via the merchant system and the payment gateway system; and receive the authorization response with the merchant application from the issuer system via the merchant system and the payment gateway system.

Clause 19. The computer program product of any of clauses 15-18, wherein the program instructions, when executed by the at least one processor, further cause the at least one processor to: receive, with the issuer application, from the merchant application, the request for the dynamic passcode; in response to receiving the request for the dynamic passcode, generate, with the issuer application, the dynamic passcode; and transmit, from the issuer application, to the merchant application, the dynamic passcode.

Clause 20. The computer program product of any of clauses 15-19, wherein the program instructions, when executed by the at least one processor, further cause the at least one processor to: before receiving, with the merchant application installed on the user device, the transaction data associated with the transaction at the merchant system, transmit, from the issuer application, to the issuer system, a request to register the issuer application installed on the user device with the issuer system, wherein the request to register the issuer application includes a token associated with each of the account identifier and a device identifier associated with the user device, and wherein the token is configured to validate the dynamic passcode; and in response to transmitting the request to register the issuer application installed on the user device with the issuer system, receive, with the issuer application, from the issuer system, a confirmation that the issuer application is registered with the issuer system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1A:
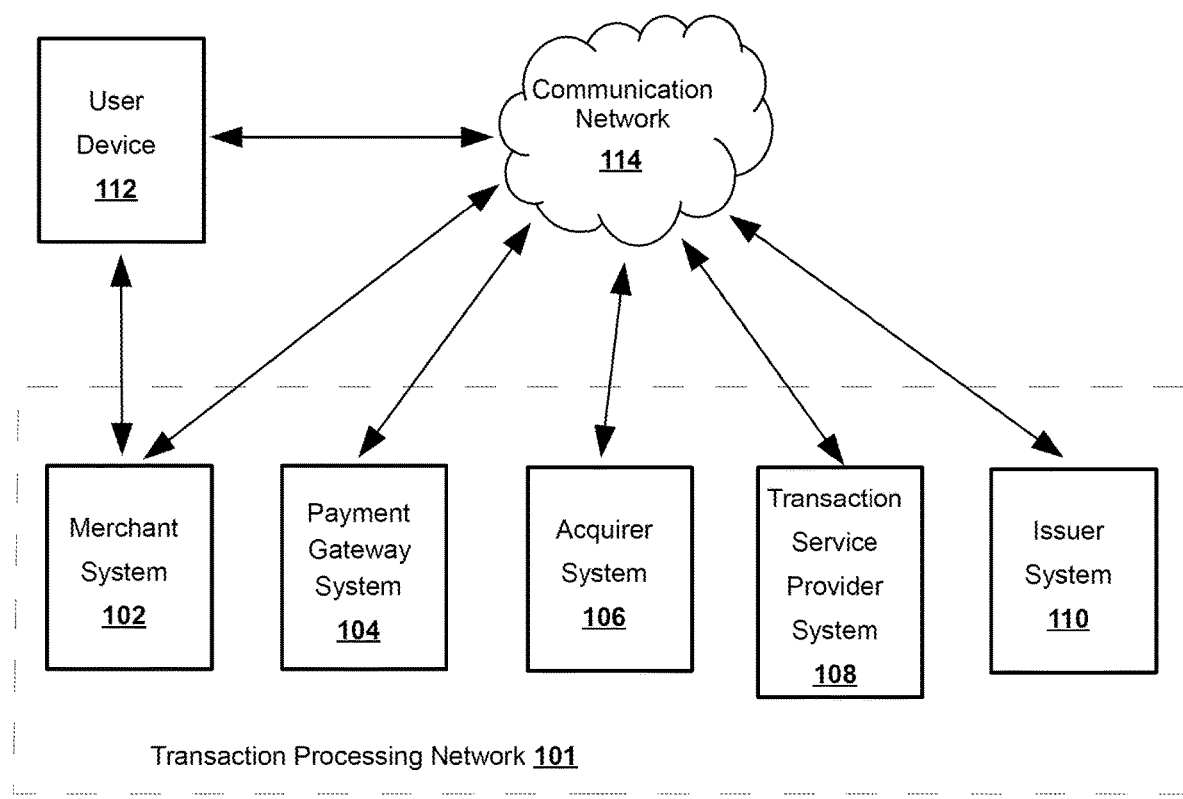
FIGS. 1A and 1B are diagrams of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for dynamic passcode communication that receive, with a merchant application installed on a user device, transaction data associated with a transaction at a merchant system, wherein the merchant application is associated with the merchant system, wherein the transaction data includes an account identifier associated with an account at an issuer system; determine, with the merchant application, based on the account identifier, whether an issuer application associated with the issuer system is installed on the user device; in response to determining that the issuer application associated with the issuer system is installed on the user device, transmit, from the merchant application, to the issuer application, a request for a dynamic passcode; receive, with the merchant application, from the issuer application, the dynamic passcode; transmit, from the merchant application, to the issuer system, an authorization request requesting authorization of the transaction, wherein the authorization request includes the account identifier and the dynamic passcode; and receive, with the merchant application, from the issuer system, an authorization response authorizing or denying the transaction.

In this way, an issuer SDK can be used for dynamic passcode generation, the dynamic passcode can be securely transmitted to a merchant SDK, and the dynamic passcode can be included in an authorization request to be used by an issuer system to authenticate a transaction, which enables more frictionless multi-factor authentication (MFA) for electronic payment transactions by reducing a number of steps that a customer performs to successfully complete a transaction, decreasing a number of application calls after a transaction is initiated, and decreasing a number of communications between transaction processing systems.

Figure 1B:
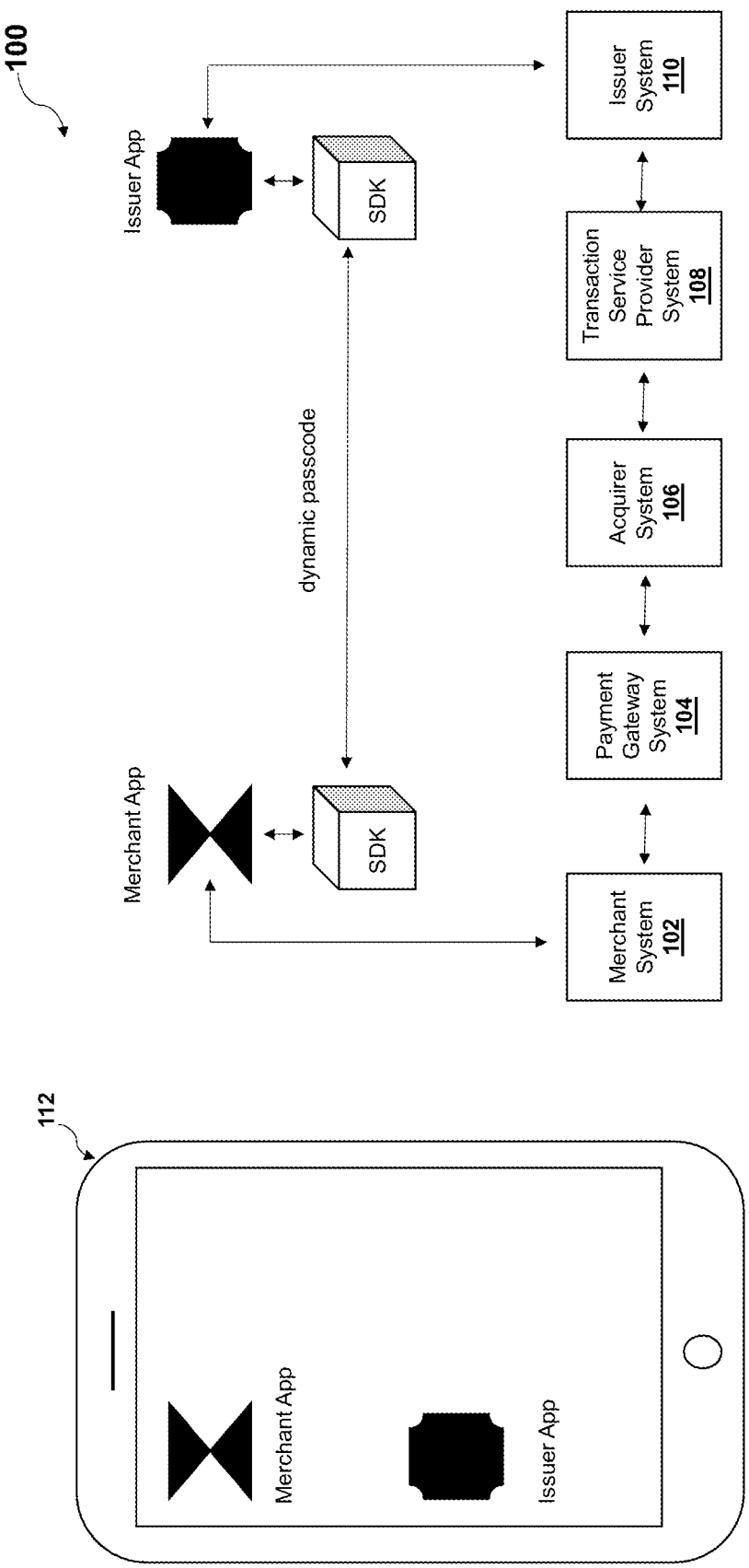

Referring now to FIGS. 1A and 1B, FIGS. 1A and 1B are diagrams of an example environment 100 in which devices, systems, methods, and/or products described herein, may be implemented. As shown in FIGS. 1A and 1B, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection.

As shown in FIG. 1B, in some non-limiting embodiments or aspects, user device 112 may include one or more applications associated with user device 112, such as an application stored, installed, and/or executed on user device 112 (e.g., a mobile device application, a native application for a mobile device, a mobile cloud application for a mobile device, an electronic wallet application, a peer-to-peer payment transfer application, a merchant application, an issuer application, etc.).

For example, user device 112 may include a merchant application associated with merchant system 102. The merchant application may be capable of being used by a user to conduct an electronic payment transaction with merchant system 102. A merchant software development kit (SDK) may be integrated into the merchant application on user device 112. The merchant SDK may be one of Java® Development kit, .NET® framework SDK, iOS® SDK, and the like.

As an example, user device 112 may include an issuer application associated with issuer system 110. An issuer SDK may be integrated into the issuer application on user device 112. The issuer SDK may be one of Java® Development kit, .NET® framework SDK, iOS® SDK, and the like. The issuer SDK may be configured to generate a dynamic passcode or one-time password (OTP) that can be used by issuer system 110 to authenticate an electronic payment transaction conducted with the merchant application on user device 112 using an account associated with issuer system 110. For example, the issuer SDK may bind or link a token to user device 112 (e.g., to a device identifier associated with user device 112, etc.), the issuer application installed on user device 112 (e.g., to an application identifier associated with the issuer application, etc.), and/or an account identifier associated with the account and register the token at issuer system 110 for validating the dynamic passcode. As an example, the merchant SDK in the merchant application may be configured to communicate with the issuer SDK in the issuer application and, in response to receiving a request from the merchant SDK, the issuer SDK may securely communicate the dynamic passcode generated on the issuer application with the issuer SDK to the merchant SDK in the issuer application. In such an example, the merchant SDK may provide the dynamic passcode with an authorization request requesting authorization of the electronic payment transaction to issuer system 110.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
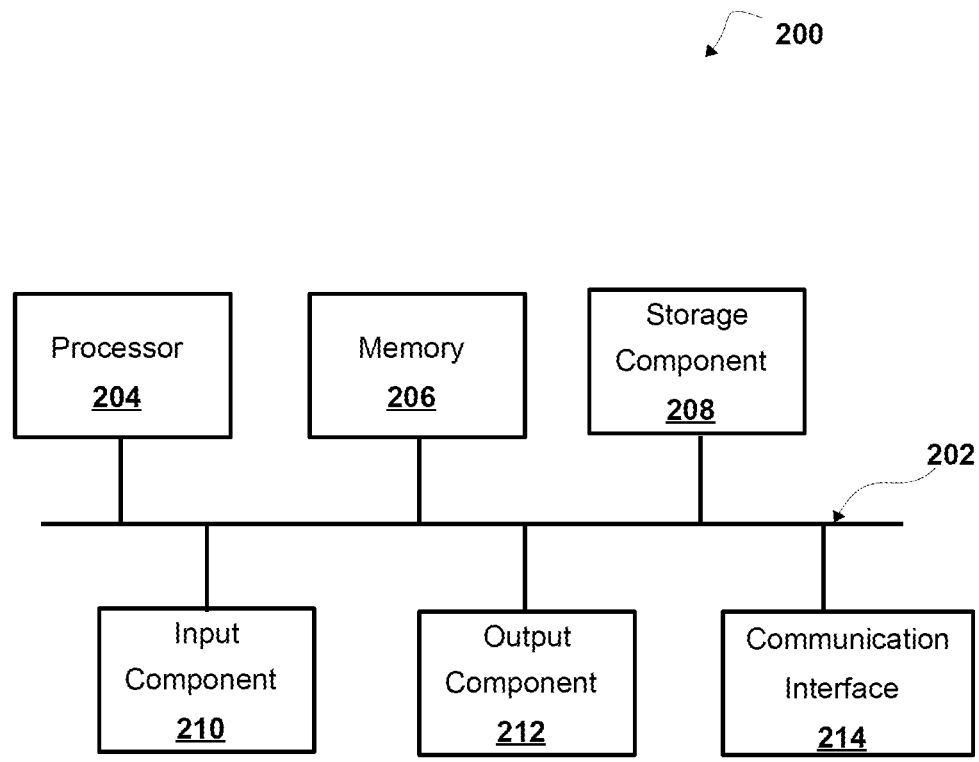
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
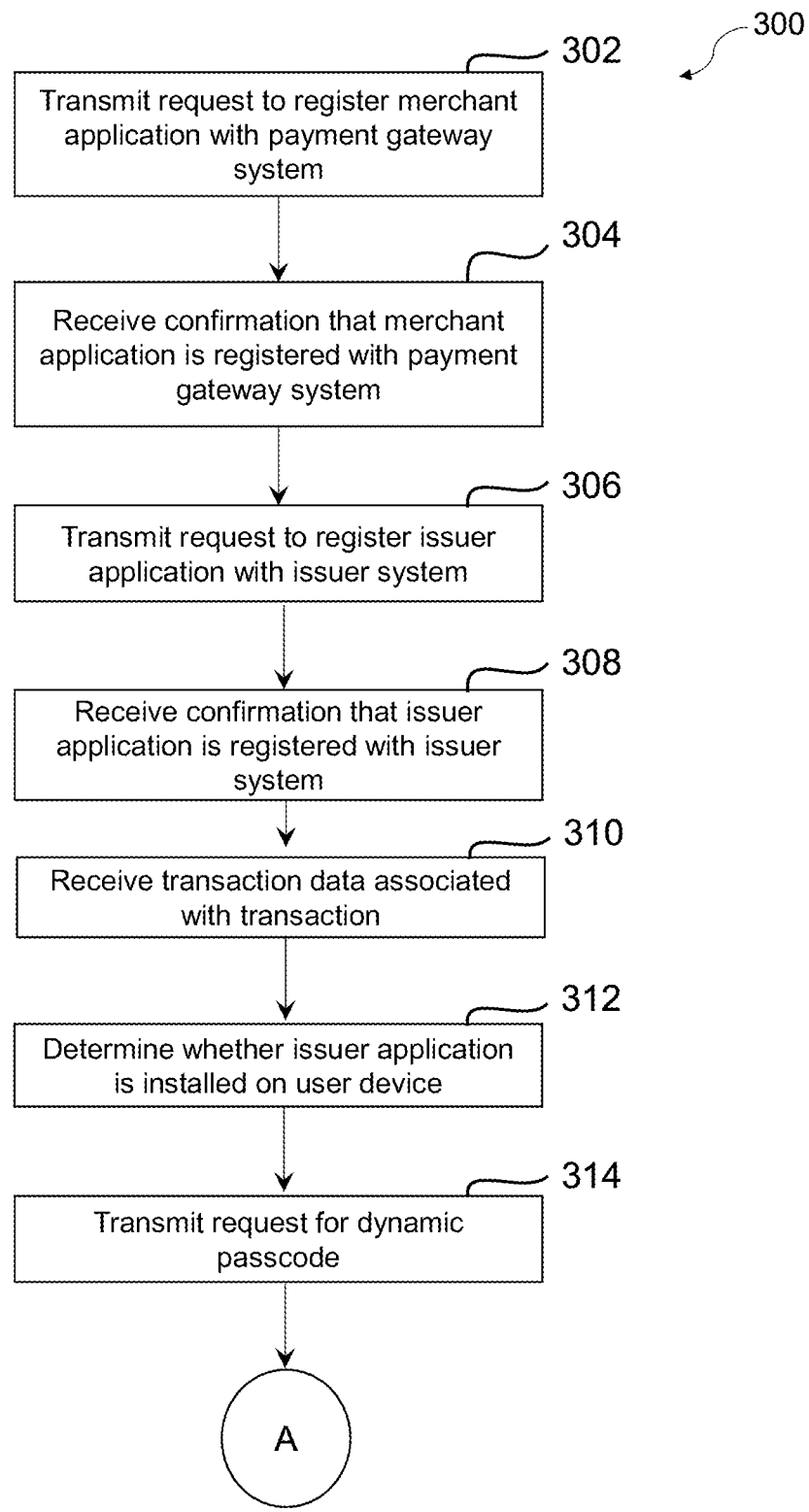
FIGS. 3A and 3B are a flowchart of non-limiting embodiments or aspects of a process for dynamic passcode communication.
Figure 3B:
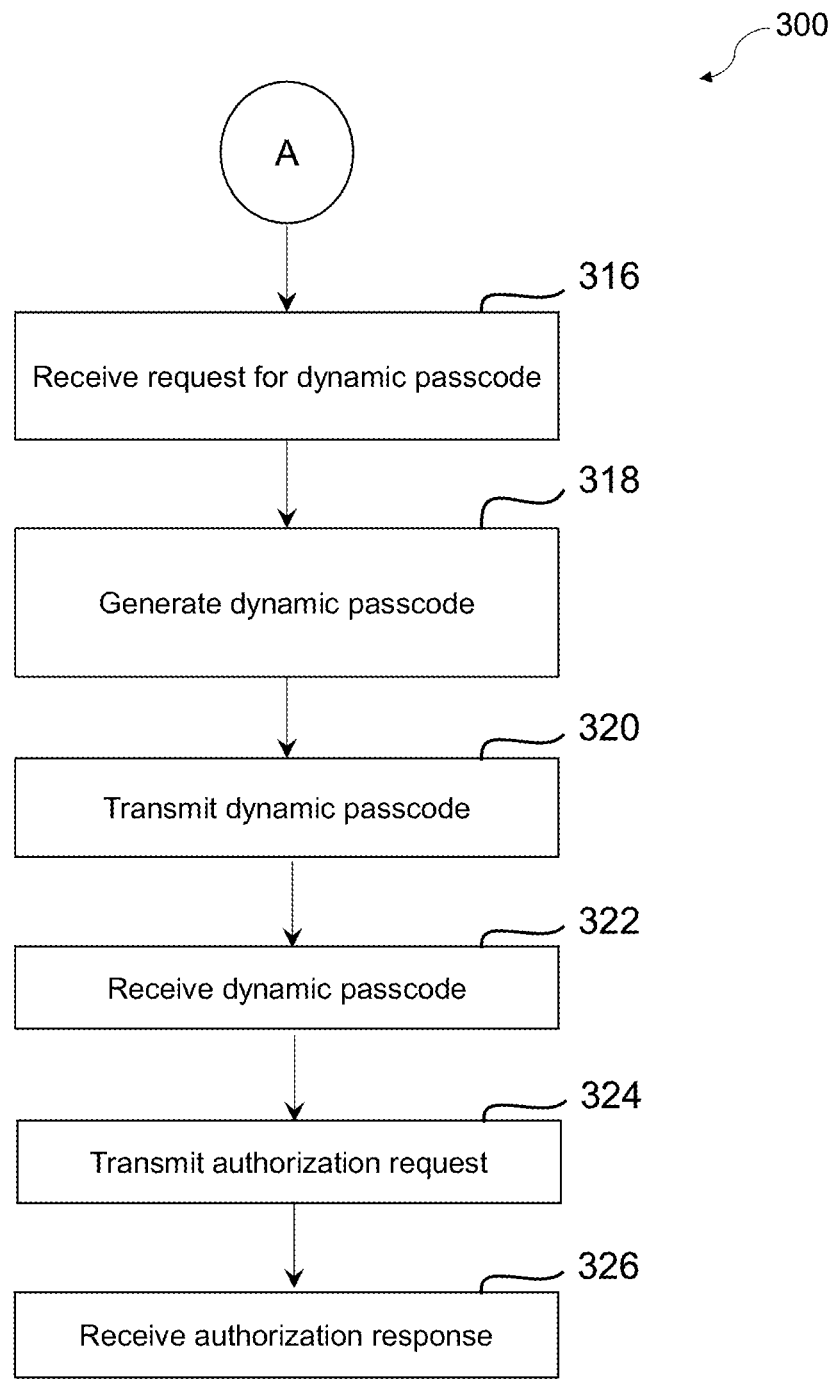

Referring now to FIGS. 3A and 3B, FIGS. 3A and 3B are a flowchart of non-limiting embodiments or aspects of a process 300 for dynamic passcode communication. In some non-limiting embodiments or aspects, one or more of the steps of process 300 may be performed (e.g., completely, partially, etc.) by user device 112 (e.g., one or more devices of a system of user device 112). In some non-limiting embodiments or aspects, one or more of the steps of process 300 may be performed (e.g., completely, partially, etc.) by another device or a group of devices separate from or including user device 112, such as such as merchant system 102 (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), and/or issuer system 110 (e.g., one or more devices of issuer system 110).

As shown in FIG. 3A, at step 302, process 300 includes transmitting a request to register a merchant application with a payment gateway system. For example, user device 112 may transmit, from a merchant application installed on user device 112, to payment gateway system 104, a request to register the merchant application installed on user device 112 with payment gateway system 104.

Figure 4:
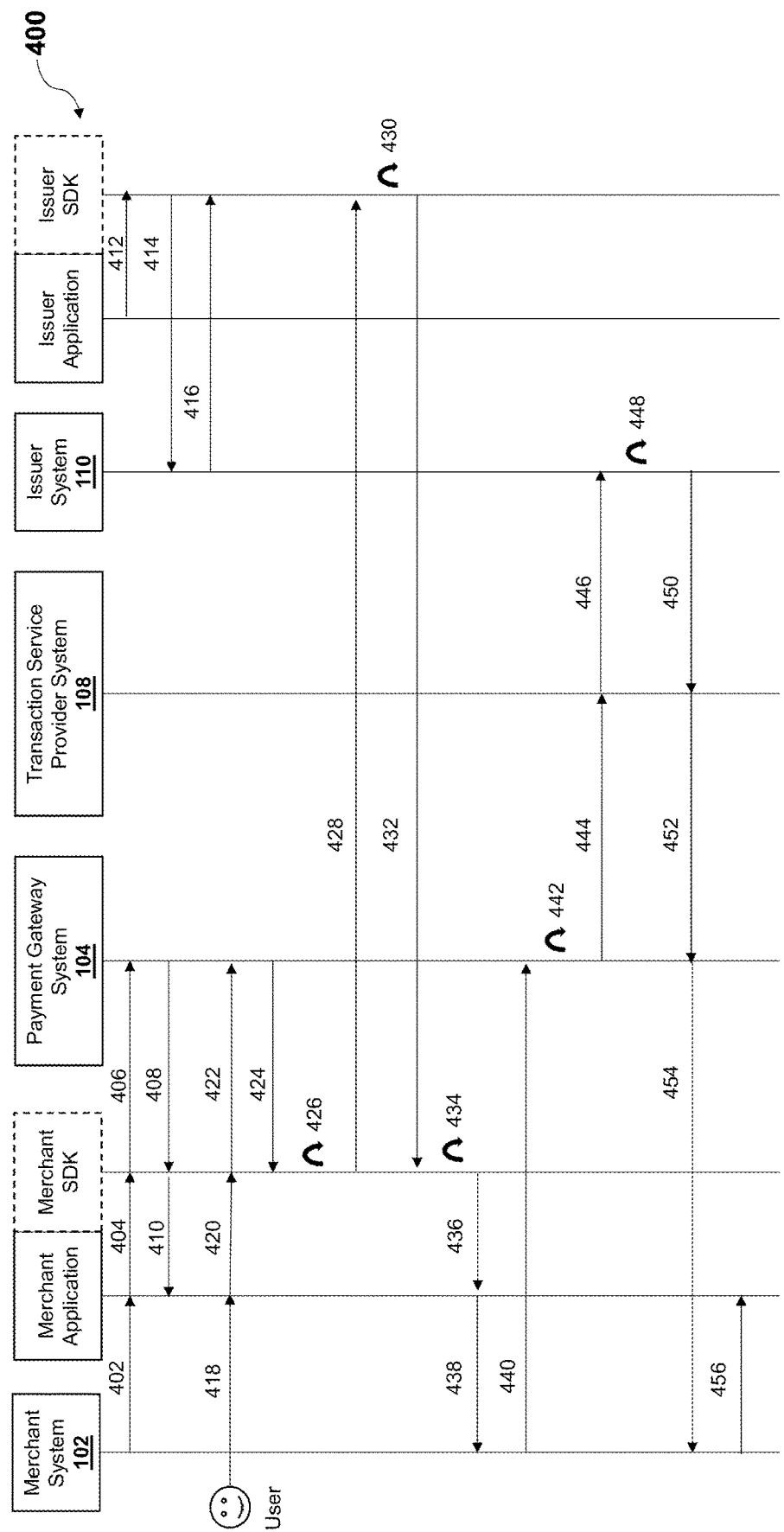
FIG. 4 is a signal flow diagram of an implementation of non-limiting embodiments or aspects of a process for dynamic passcode communication.

Referring also to FIG. 4, FIG. 4 is a signal flow diagram of an implementation 400 of non-limiting embodiments or aspects of a process for dynamic passcode communication. As shown in FIG. 4, at reference number 402, the merchant application may request and receive a token (e.g., a JSON web token, etc.) from merchant system 102 and, at reference number 404, provide the token associated with merchant system 102 to the merchant SDK. At reference number 406, the merchant SDK may transmit, to payment gateway system 104, the token with the request to register the merchant application with payment gateway system.

As shown in FIG. 3A, at step 304, process 300 includes receiving a confirmation that a merchant application is registered with a payment gateway system. For example, user device 112 may, in response to transmitting the request to register the merchant application installed on user device 112, receive, with the merchant application, from payment gateway system 104, a confirmation that the merchant application is registered with payment gateway system 104. As an example, and as shown in FIG. 4, at reference number 408, the merchant SDK may receive the confirmation that the merchant application is registered with payment gateway system 104 and, at reference number 410, provide the confirmation to the merchant application.

As shown in FIG. 3A, at step 306, process 300 includes transmitting a request to register an issuer application with an issuer system. For example, user device 112 may transmit, from the issuer application, to issuer system 110, a request to register the issuer application installed on user device 112 with issuer system 110. The request to register the issuer application may include a token associated with each of the account identifier and a device identifier associated with user device 112. The token may be configured to validate the dynamic passcode.

As an example, and as shown in FIG. 4, at reference number 412, the issuer application may request (e.g., in response to a user logging into the issuer application, etc.) the issuer SDK to initialize registration with issuer system 110 and, in response thereto, at reference number 414, the issuer SDK may transmit, to issuer system 110, the request to register the issuer application installed on user device 112 with issuer system 110. In such an example, the issuer SDK may bind or link a token to user device 112 (e.g., to a device identifier associated with user device 112, etc.), the issuer application installed on user device 112 (e.g., to an application identifier associated with the issuer application, etc.), and/or an account identifier associated with an account that is associated with the installed issuer application and transmit the token with the request to register the issuer application installed on user device 112 with issuer system 110. The token may be stored and/or registered by issuer system 110 in association with the account identifier for use in validating a dynamic passcode generated by the issuer SDK in association with an electronic payment transaction that uses the account identifier.

As shown in FIG. 3A, at step 308, process 300 includes receiving a confirmation that an issuer application is registered with an issuer system. For example, user device 112 may, in response to transmitting the request to register the issuer application installed on user device 112 with issuer system 110, receive, with the issuer application, from issuer system 110, a confirmation that the issuer application is registered with issuer system 110. As an example, and as shown in FIG. 4, at reference number 416, the merchant SDK may receive, from issuer system 110, the confirmation that the issuer application is registered with issuer system 110.

As shown in FIG. 3A, at step 310, process 300 includes receiving transaction data associated with a transaction. For example, user device 112 may receive, with a merchant application installed on user device 112, transaction data associated with a transaction at merchant system 102. The merchant application may be associated with merchant system 102. The transaction data may include an account identifier (e.g., a PAN, a BIN, etc.) associated with an account at issuer system 110.

As an example, and as shown in FIG. 4, at reference number 418, the merchant application may receive and/or determine, based on user input from a user to the merchant application, parameters associated with the transaction and, at reference number 420, provide one or more of the parameters (e.g., a BIN, etc.) to the merchant SDK.

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a merchant, a MCG, a MCC, and/or the like.

As shown in FIG. 3A, at step 312, process 300 includes determining whether an issuer application is installed on a user device. For example, user device 112 may determine, with the merchant application, based on the account identifier, whether an issuer application associated with issuer system 110 is installed on user device 112. As an example, user device 112 may transmit, from the merchant application, to payment gateway system 104, at least a portion of the account identifier, receive, with the merchant application, from payment gateway system 104, an identification of the issuer application associated with issuer system 110 associated with the account identifier, and determine, based on the identification, with the merchant application, whether the issuer application associated with issuer system 110 associated with the account identifier is installed on user device 112.

In such an example, and as shown in FIG. 4, at reference number 422, the merchant SDK may transmit the BIN to payment gateway system 104 and, at reference number 424, the merchant SDK may receive the identification of the issuer application (e.g., a name of the issuer application, a name of an issuer associated with issuer system 110, etc.) associated with the BIN. At reference number 426, the merchant SDK may scan user device 112 for the identified issuer application and/or verify if the issuer application includes the issuer SDK integrated within the issuer application.

As shown in FIG. 3A, at step 314, process 300 includes transmitting a request for a dynamic passcode. For example, user device 112 may, in response to determining that the issuer application associated with issuer system 110 is installed on user device 112, transmit, from the merchant application, to the issuer application, a request for a dynamic passcode. As an example, and as shown in FIG. 4, at reference number 428, the merchant SDK may transmit, in response to determining that the issuer application associated with issuer system 110 is installed on user device 112 and includes the issuer SDK, to the issuer SDK, the request for the dynamic passcode. In such an example, the merchant SDK may communicate directly with the issuer SDK.

As shown in FIG. 3B, at step 316, process 300 includes receiving a request for a dynamic passcode. For example, user device 112 may receive, with the issuer application, from the merchant application, the request for the dynamic passcode. As an example, and as shown in FIG. 4, again at reference number 428, the issuer SDK may receive, from the merchant SDK, the request for the dynamic passcode. In such an example, the request for the dynamic passcode may include the account identifier and/or a device identifier associated with user device 112.

As shown in FIG. 3B, at step 318, process 300 includes generating a dynamic passcode. For example, user device 112 may, in response to receiving the request for the dynamic passcode, generate, with the issuer application, the dynamic passcode. As an example, and as shown in FIG. 4, at reference number 430, the issuer SDK may generate, based on the account identifier and/or the device identifier, the dynamic passcode. In such an example, the dynamic passcode may be configured for validation with the token registered at issuer system 110 in association with the account identifier.

As shown in FIG. 3B, at step 320, process 300 includes transmitting a dynamic passcode. For example, user device 112 may transmit, from the issuer application, to the merchant application, the dynamic passcode. As an example, and as shown in FIG. 4, at reference number 432, the issuer SDK may transmit, to the merchant SDK, the dynamic passcode. In such an example, the issuer SDK may communicate directly with the merchant SDK.

As shown in FIG. 3B, at step 322, process 300 includes receiving a dynamic passcode. For example, user device 112 may receive, with the merchant application, from the issuer application, the dynamic passcode. As an example, and as shown in FIG. 4, again at reference number 432, the merchant SDK may receive, from the issuer SDK, the dynamic passcode.

As shown in FIG. 3B, at step 324, process 300 includes transmitting an authorization request. For example, user device 112 may transmit, from the merchant application, to issuer system 110, an authorization request requesting authorization of the transaction. The authorization request may include the account identifier and the dynamic passcode. In such an example, user device 112 may transmit the authorization request from the merchant application to issuer system 110 via merchant system 102, payment gateway system 104, acquirer system 106, and/or transaction service provider system 108 (e.g., via transaction processing network 101, etc.).

As an example, and as shown in FIG. 4, at reference number 434, the merchant SDK may bundle and encrypt the dynamic passcode with other authentication parameters and/or transaction parameters (e.g., a username, a password, a pin, a CVV, a PAN, etc.) and, at reference number 436, provide the bundled and encrypted data to the merchant application. At reference number 438, the merchant application may transmit the bundled and encrypted data to merchant system 102 and, at reference number 440, merchant system 102 may transmit the bundled and encrypted data to payment gateway system 104. At reference number 442, payment gateway system 104 may decrypt the data to recover the dynamic passcode and, at reference number 444, transmit the dynamic passcode as part of the authorization request to transaction service provider system 108. At reference number 446, transaction service provider system 108 may transmit risk data associated with a predicted risk of the transaction with the authorization request including the dynamic passcode to issuer system 110. At reference number 448, issuer system 110 may receive the authorization request and determine whether to authorize or deny the transaction based on the risk data and/or the dynamic passcode.

As shown in FIG. 3B, at step 326, process 300 includes receiving an authorization response. For example, user device 112 may receive, with the merchant application, from issuer system 110, an authorization response authorizing or denying the transaction. In such an example, user device 112 may receive the authorization response with the merchant application from issuer system 110 via merchant system 102, payment gateway system 104, acquirer system 106, and/or transaction service provider system 108 (e.g., via transaction processing network 101, etc.).

As an example, and as shown in FIG. 4, at reference number 450, issuer system 110 may transmit the authorization response to transaction service provider system 108 and, at reference number 452, transaction service provider system 108 may transmit the authorization response to payment gateway system 104. At reference number 454, payment gateway system 104 may transmit the authorization response to merchant system 102 and, at reference number 456, merchant system 102 may transmit the authorization response to the merchant application, which may provide the authorization response including the authorization or denial of the transaction to the user via user device 112.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:

transmitting, with at least one processor, with an issuer application installed on a user device, to an issuer system, a request to register the issuer application installed on the user device with the issuer system, wherein the request to register the issuer application includes a token bound, by the issuer application, to each of an account identifier associated with an account at the issuer system and to a device identifier associated with the user device;

in response to transmitting the request to register the issuer application installed on the user device with the issuer system, receiving, with the at least one processor, with the issuer application installed on the user device, from the issuer system, a confirmation that the issuer application is registered with the issuer system;

receiving, with the at least one processor, with a merchant application installed on the user device, transaction data associated with a transaction at a merchant system, wherein the merchant application is associated with the merchant system, wherein the transaction data includes the account identifier associated with the account at the issuer system;

scanning, with the at least one processor, with the merchant application installed on the user device, the user device to determine whether the issuer application associated with the issuer system is installed on the user device;

in response to determining that the issuer application associated with the issuer system is installed on the user device, transmitting, with the at least one processor, with the merchant application installed on the user device, directly to the issuer application installed on the user device, a request for a one-time password;

receiving, with the at least one processor, with the issuer application installed on the user device, directly from the merchant application installed on the user device, the request for the one-time password;

generating, with the at least one processor, with the issuer application installed on the user device, based on the account identifier and the device identifier, the one-time password, wherein the one-time password is configured for validation with the token registered at the issuer system in association with the account identifier and the device identifier;

transmitting, with the at least one processor, with the issuer application installed on the user device, directly to the merchant application installed on the user device, the one-time password;

receiving, with the at least one processor, with the merchant application installed on the user device, directly from the issuer application installed on the user device, the one-time password;

bundling and encrypting, with the at least one processor, with the merchant application installed on the user device, the one-time password and the account identifier into an authorization request requesting authorization of the transaction;

transmitting, with the at least one processor, with the merchant application installed on the user device, to the issuer system, the authorization request requesting authorization of the transaction, wherein the authorization request includes the bundled and encrypted account identifier and one-time password; and receiving, with the at least one processor, with the merchant application installed on the user device, from the issuer system, an authorization response authorizing or denying the transaction.

2. The computer-implemented method of claim 1, further comprising:

before receiving, with the merchant application installed on the user device, the transaction data associated with the transaction at the merchant system, transmitting, with the at least one processor, from the merchant application, to a payment gateway system, a request to register the merchant application installed on the user device with the payment gateway system; and in response to transmitting the request to register the merchant application installed on the user device, receiving, with the at least one processor, with the merchant application, from the payment gateway system, a confirmation that the merchant application is registered with the payment gateway system.

3. The computer-implemented method of claim 2, wherein scanning, with the merchant application installed on the user device, the user device to determine whether the issuer application associated with the issuer system is installed on the user device includes:

transmitting, with the merchant application installed on the user device, to the payment gateway system, at least a portion of the account identifier;

receiving, with the merchant application installed on the user device, from the payment gateway system, an identification of the issuer application associated with the issuer system associated with the account identifier; and scanning, with the merchant application installed on the user device, the user device for the identified issuer application.

4. The computer-implemented method of claim 3, wherein the at least one processor transmits the authorization request from the merchant application to the issuer system via the merchant system and the payment gateway system.

5. The computer-implemented method of claim 3, wherein the at least one processor receives the authorization response with the merchant application from the issuer system via the merchant system and the payment gateway system.

6. A system comprising:

at least one processor programmed and/or configured to:

transmit, with an issuer application installed on a user device, to an issuer system, a request to register the issuer application installed on the user device with the issuer system, wherein the request to register the issuer application includes a token bound, by the issuer application, to each of an account identifier associated with an account at the issuer system and to a device identifier associated with the user device;

in response to transmitting the request to register the issuer application installed on the user device with the issuer system, receive, with the issuer application installed on the user device, from the issuer system, a confirmation that the issuer application is registered with the issuer system;

receive, with a merchant application installed on the user device, transaction data associated with a transaction at a merchant system, wherein the merchant application is associated with the merchant system, wherein the transaction data includes the account identifier associated with the account at the issuer system;

scan, with the merchant application installed on the user device, the user device to determine whether the issuer application associated with the issuer system is installed on the user device;

in response to determining that the issuer application associated with the issuer system is installed on the user device, transmit, with the merchant application installed on the user device, directly to the issuer application installed on the user device, a request for a one-time password;

receive, with the issuer application installed on the user device, directly from the merchant application installed on the user device, the request for the one-time password;

generate, with the issuer application installed on the user device, based on the account identifier and the device identifier, the one-time password, wherein the one-time password is configured for validation with the token registered at the issuer system in association with the account identifier and the device identifier;

transmit, with the issuer application installed on the user device, directly to the merchant application installed on the user device, the one-time password;

receive, with the merchant application installed on the user device, directly from the issuer application installed on the user device, the one-time password;

bundle and encrypt, with the merchant application installed on the user device, the one-time password and the account identifier into an authorization request requesting authorization of the transaction;

transmit, with the merchant application installed on the user device, to the issuer system, the authorization request requesting authorization of the transaction, wherein the authorization request includes the bundled and encrypted account identifier and one-time password; and receive, with the merchant application installed on the user device, from the issuer system, an authorization response authorizing or denying the transaction.

7. The system of claim 6, wherein the at least one processor is further programmed and/or configured to:

before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

8. The system of claim 7, wherein the at least one processor is programmed and/or configured to scan, with the merchant application installed on the user device, the user device to determine whether the issuer application associated with the issuer system is installed on the user device by:

transmitting, with the merchant application installed on the user device, to the payment gateway system, at least a portion of the account identifier;

receiving, with the merchant application installed on the user device, from the payment gateway system, an identification of the issuer application associated with the issuer system associated with the account identifier; and scanning, with the merchant application installed on the user device, the user device for the identified issuer application.

9. The system of claim 8, wherein the at least one processor is further programmed and/or configured to transmit the authorization request from the merchant application to the issuer system via the merchant system and the payment gateway system.

10. The system of claim 8, wherein the at least one processor is further programmed and/or configured to receive the authorization response with the merchant application from the issuer system via the merchant system and the payment gateway system.

11. A computer program product comprising at least one non-transitory computer-readable medium including program instructions that, when executed by at least one processor, cause the at least one processor to:

transmit, with an issuer application installed on a user device, to an issuer system, a request to register the issuer application installed on the user device with the issuer system, wherein the request to register the issuer application includes a token bound, by the issuer application, to each of an account identifier associated with an account at the issuer system and to a device identifier associated with the user device;

in response to transmitting the request to register the issuer application installed on the user device with the issuer system, receive, with the issuer application installed on the user device, from the issuer system, a confirmation that the issuer application is registered with the issuer system;

receive, with a merchant application installed on the user device, transaction data associated with a transaction at a merchant system, wherein the merchant application is associated with the merchant system, wherein the transaction data includes the account identifier associated with the account at the issuer system;

scan, with the merchant application installed on the user device, the user device to determine whether the issuer application associated with the issuer system is installed on the user device;

in response to determining that the issuer application associated with the issuer system is installed on the user device, transmit, with the merchant application installed on the user device, directly to the issuer application installed on the user device, a request for a one-time password;

receive, with the issuer application installed on the user device, directly from the merchant application installed on the user device, the request for the one-time password;

generate, with the issuer application installed on the user device, based on the account identifier and the device identifier, the one-time password, wherein the one-time password is configured for validation with the token registered at the issuer system in association with the account identifier and the device identifier;

transmit, with the issuer application installed on the user device, directly to the merchant application installed on the user device, the one-time password;

receive, with the merchant application installed on the user device, directly from the issuer application installed on the user device, the one-time password;

bundle and encrypt, with the merchant application installed on the user device, the one-time password and the account identifier into an authorization request requesting authorization of the transaction;

transmit, with the merchant application installed on the user device, to the issuer system, the authorization request requesting authorization of the transaction, wherein the authorization request includes the bundled and encrypted account identifier and one-time password; and receive, with the merchant application installed on the user device, from the issuer system, an authorization response authorizing or denying the transaction.

12. The computer program product of claim 11, wherein the program instructions, when executed by the at least one processor, further cause the at least one processor to:

before receiving, with the merchant application installed on the user device, the transaction data associated with the transaction at the merchant system, transmit, from the merchant application, to a payment gateway system, a request to register the merchant application installed on the user device with the payment gateway system; and in response to transmitting the request to register the merchant application installed on the user device, receive, with the merchant application, from the payment gateway system, a confirmation that the merchant application is registered with the payment gateway system.

13. The computer program product of claim 12, wherein the program instructions, when executed by the at least one processor, cause the at least one processor to scan, with the merchant application installed on the user device, the user device to determine whether the issuer application associated with the issuer system is installed on the user device by:

transmitting, with the merchant application installed on the user device, to the payment gateway system, at least a portion of the account identifier;

receiving, with the merchant application installed on the user device, from the payment gateway system, an identification of the issuer application associated with the issuer system associated with the account identifier; and scanning, with the merchant application installed on the user device, the user device for the identified issuer application.

14. The computer program product of claim 13, wherein the program instructions, when executed by the at least one processor, further cause the at least one processor to:

transmit the authorization request from the merchant application to the issuer system via the merchant system and the payment gateway system; and receive the authorization response with the merchant application from the issuer system via the merchant system and the payment gateway system.

* * * * *